3,085,114
OXO PROCESS FOR THE PRODUCTION OF HIGHER MOLECULAR WEIGHT OXO PRODUCTS USING A COMBINATION CATALYST

Robert A. Heimsch and William E. Weesner, Dayton, Ohio, assignors to Monsanto Chemical Company, St. Louis, Mo., a corporation of Delaware
No Drawing. Filed June 19, 1959, Ser. No. 821,382
6 Claims. (Cl. 260—638)

The present invention relates to a method for conducting a chemical reaction combining the steps of carbonylation, condensation and hydrogenation, by the use of a combination catalyst. It is an object of the invention to provide a method whereby the carbonylation of lower olefins to produce aldehydes concomitantly results in the production of dehydrated aldols and alcohols of higher molecular weight than the aldehydes which are normally produced in carbonylation.

The olefin carbonylation process as conducted in the prior art results in the addition of carbon monoxide and hydrogen to lower olefins to give aldehydes containing one more carbon atom. For example, in the carbonylation of propylene, the direct products which are formed are n-butyraldehyde and isobutyraldehyde.

It has been found that a process may be conducted for the production of dehydrated aldols by contacting an olefin having from 2 to 12 carbon atoms in the presence of carbon monoxide and hydrogen under a pressure of at least 1000 p.s.i and at a temperature of from 100° to 200° C. in the presence of a specific catalyst selected from the group consisting of the oxides, hydroxides, salts and carbonyls of cobalt and iron together with an organic manganese salt. The novel combination catalyst has been found to be of utility throughout the range of proportions of the two component members; a preferred range is from 10 to 90 percent by weight of a compound selected from the group consisting of oxides, hydroxides, salts and carbonyls of cobalt and iron and 90 to 10 percent by weight of an organic manganese salt. The catalyst may be used in the range of 1 to 20 percent by weight relative to the charge of olefin.

The present invention is applicable to olefinic compounds such as the lower aliphatic olefins having from 2 to 12 carbon atoms. However, the process is likewise applicable to aromatic and cycloaliphatic compounds having olefinic unsaturation such as styrene and vinylcyclohexane. The reaction may be carried out by dissolving or suspending the combination catalyst as described herein in the reaction mixture or by employing a solvent in order to facilitate the introduction of the catalytic components into the reaction system.

The catalyst contemplated by the present invention is based upon a combination of two components. The first component is an oxide, hydroxide, salt or carbonyl of a metal of the group consisting of iron and cobalt. Inorganic salts such as the nitrate, carbonate, chloride, or sulfate may be employed. However, it is preferred that the said salt be a salt of an organic acid, still more preferably having from 4 to 20 carbon atoms. Examples of the acid moiety in combination with the said metals include the stearate, α-ethylcaproate, also known as 2-ethylhexoate, dodecanoate, naphthenate, tallate (acids from tall oil), phthalate, benzoate, maleate, adipate and the like. The term salt as used herein also includes other organic compounds such as cobalt acetylacetonate.

The second component of the combination catalyst is an organic manganese salt. It is preferred that the said salt be a carboxylate which is soluble in the aldehyde product resulting from the oxonation. Preferred examples of such manganese carboxylates include the stearate, α-ethylcaproate, dodecanoate, naphthenate, tallates and the like.

The combination catalyst may be dissolved or dispersed in the reaction product or in a solvent such as benzene or other hydrocarbons, or ethers such as diethyl ether. The present reaction may also be conducted in the presence of free acids, as set forth above, which may be present in a concentration of 0.01% to 10% by weight, relative to the said salts described above.

The process of the present invention involving a combination method for conducting an oxonation reaction together and concomitantly with a condensation reaction using a cobalt-manganese catalyst may be carried out in a number of ways. The simplest method of operation is to employ a batch type of reactor to which the desired proportions of olefin, carbon monoxide and hydrogen are charged together with the aforesaid combination catalyst. The entire charge in this method is placed in an autoclave or other type of batch vessel. The charge is then heated to the desired temperature for oxonation followed by cooling or continued processing such as at a somewhat higher temperature in order to complete the condensation of the specific aldehydes with the production of a dehydrated aldol.

The dehydrated aldols produced by the above methods may be used as intermediates in various processes, but are more commonly hydrogenated to obtain alcohols useful as solvents or plasticizer intermediates.

In another modification, a continuous process is employed utilizing either a tubular reactor or a series of stages consisting either of individual vessels or of tubular sections. For example, two individual autoclaves may be employed with the continuous passage therethrough of the entire mixture and the catalyst combination as charged at the beginning of this sequence. Thus, there may be pumped into a single autoclave for an oxonation reaction to be carried out at approximately 120° C. the catalyst combination of the cobalt salt and the manganese salt dissolved in one of the components, i.e., the olefin such as propylene concomitantly with the desired proportions of carbon monoxide and hydrogen. Such an autoclave is preferably provided with a positive agitation system in order to insure thorough contacting of the reactants and the catalyst, which after conacting with the carbon monoxide-hydrogen gas mixture, exists in the form of cobalt carbonyl and a soluble manganese compound. When employing two vessels or reaction zones, the first vessel is used for all of the oxonation. Some condensation also takes place during the time when oxonation occurs. This results in an intermediate product of substantially equal parts of n-butyraldehyde, isobutyraldehyde and some eight carbon atom aldehydes. The entire reaction mixture without the addition or abstraction of any component is then passed into a second vessel, maintained, for example, at 160° C. in which condensation takes place.

Previous discussion has indicated procedures for obtaining dehydrated aldols by a combined oxonation and condensation with the combination catalyst. It is also possible to obtain alcohols containing $2n+2$ carbon atoms from olefin containing $n$ carbon atoms by a further modification of the process. Here a three zone or three vessel reaction system may be used in which the substantially olefin-free product from the first oxonation zone (120° C.) goes to a second zone at about 150° in which the condensation is carried substantially to completion (i.e. less than 5% n-butyraldehyde content) after which the product, without addition or subtraction passes into a third zone at about 180–200° C. where the dehydrated aldols and saturated aldehydes are hydrogenated to the corresponding alcohols. With propylene, for example, good yields of 2-ethylhexanol may be obtained.

It has also been found that control of the temperature in the condensation zone can be used to regulate the ratio of aldehydes containing $2n+2$ carbon atoms relative to aldehydes containing $n+1$ carbon atoms when starting with a feed olefin containing $n$ carbon atoms. For example, a temperature of 140° C. gives 41 to 48% condensation, while a temperature of 150° C. gives substantially complete condensation.

The control of the relative proportions of $C_4$ and $C_8$ products can also be effected by regulating the total amount of the manganese salt which is present. This is expressed as the amount of manganese relative to the product (wt. basis). The range of effective condensation is above 0.2% manganese, or preferably from 0.2% to 2% by weight.

In conducting the present invention the broad range of temperatures is from 100° C. to 200° C. However, since it is also contemplated that multiple zone operations be employed, specific temperature ranges for this purpose are:

| | Broad range, °C. | Preferred range, °C. |
|---|---|---|
| Oxonation | 100-140 | 100-140 |
| Condensation | 120-160 | 140-160 |
| Hydrogenation | 160-200 | 160-200 |

The following examples specifically illustrate certain embodiments of the present invention.

Example 1

The combination catalyst charged to an autoclave-type oxonation reactor was composed of 0.038 mole of cobalt α-ethylcaproate, and 0.031 mole of manganese α-ethylcaproate. The catalyst was provided as an 8% solution in ether. The pressure vessel was employed to carry out the oxonation in which the said combination catalyst was contacted with 96 g. of a 95:5—volume proportion—propylene-propane mixture. The reaction vessel was pressurized with a mixture of carbon monoxide and hydrogen in a 4:5 volume proportion. The vessel was then heated and the reaction initiated at 112° C. and 11,300 p.s.i. It was found that the temperature rose to 132° C. and absorption of carbon monoxide and hydrogen continued until the pressure decreased to 7600 lbs. over a period of 35 minutes. The reaction vessel was then cooled and the gases released through cold traps. The liquid products were then distiled to give a 44.9% conversion to 2-ethyl-2-hexenal.

Example 2

An experiment was conducted similarly to Example 1, but using a combination catalyst of 13.2 g. of cobalt α-ethylcaproate, and 10.4 g. of zinc α-ethylcaproate. It was found that the conversion to 2-ethyl-2-hexenal was 24.8%.

The above data indicates that the combination catalyst containing manganese is almost twice as effective as that containing zinc together with cobalt.

Example 2a

A control experiment was carried out similarly to that of Example 1 employing an equivalent amount of the said cobalt α-ethylcaproate as the sole catalyst without the presence of the manganese α-ethylcaproate. It was found that the conversion to 2-ethyl-2-hexenal in this case was only 11.8 percent.

Example 3

In order to test the effectiveness of a Co–Mn combination catalyst in a unitary process to yield alcohols, a two zone system was used. The first vessel was a stirred pot into which was pumped 2.5 lbs./hr. of a 96:4 volume proportion of propylene-propane mixture. The reaction vessel was pressurized at 3000 p.s.i. with a mixture of carbon monoxide and hydrogen in a 1:1 volume proportion and the gas feed rate was 3.4 lb./hr. The catalyst combination, dissolved in the propylene feed, contained cobalt α-ethylcaproate (calculated as 0.85 wt. percent cobalt metal) and manganese α-ethylcaproate (calculated as 0.9 wt. percent relative to the feed). The first zone was employed for the production of $C_4$ and $C_8$ aldehydes.

The oxonation and condensation reactions were carried out in the first zone at a temperature of about 120° C. The effluent product from the stirred pot was passed directly into a tubular reactor maintained at an average temperature of 180° C. to effect hydrogenation of aldehyde products from the first zone. The liquid product was cooled and the gases released through cold traps. The liquid products were found to be substantially entirely composed of saturated alcohols.

Example 4

The procedure set forth in Example 3 was repeated using equivalent proportions of cobalt tallate and manganese tallate. It was found that the results obtained were similar to those of the preceding example, with the production of a product consisting substantially entirely of saturated alcohols.

Example 5

The procedure of Example 3 was carried out with the employment of cobalt naphthenate and manganese naphthenate as the catalyst. The results obtained were similar to those of Example 3 with the production of a product consisting almost entirely of saturated alcohols.

Example 6

The procedure of Example 3 was carried out, with the modification that the catalyst consisted of 50% by weight of cobalt carbonyl (dissolved in ether) and 50% by weight of manganese α-ethylcaproate. The results obtained were similar to those of Example 3 with the production of a product consisting almost entirely of saturated alcohols.

What is claimed is:

1. A process for the production of saturated alcohols which comprises contacting an entire reaction mixture, without the abstraction of any components, the said reaction mixture consisting of an olefin having from 2–12 carbon atoms, carbon monoxide and hydrogen, at a pressure of at least 1,000 p.s.i. within an oxonation zone at a temperature of from 100° C. to 140° C., followed by a condensation zone of from 140° C. to 160° C., and a hydrogenation zone of from 160° C. to 200° C. all of said steps being carried out in the presence of a catalyst comprising a mixture of from 10% to 90% by weight of a compound selected from the group consisting of the oxides, hydroxides, salts and carbonyls of iron and cobalt, and from 90% to 10% by weight of a manganese salt selected from the group consisting of manganese stearate, manganese α-ethylcaproate, manganese dodecanoate, manganese naphthenate and manganese tallate.

2. A process for the production of saturated alcohols having $2n+2$ carbon atoms which comprises contacting an entire reaction mixture, without the abstraction of any components, the said mixture consisting of an olefin having $n$ carbon atoms, wherein $n$ is a whole number from 2–12 carbon monoxide and hydrogen at a pressure of at least 1,000 p.s.i. within an oxonation zone at a temperature of from 100° C. to 140° C., followed by a condensation zone of from 140° C. to 160° C., and a hydrogenation zone of from 160° C. to 200° C. all of said steps being carried out in the presence of a catalyst comprising a mixture of from 10% to 90% by weight of a compound selected from the group consisting of the oxides, hydroxides, salts and carbonyls of iron and cobalt, and from 90% to 10% by weight of an organic manganese salt.

3. A process for the production of alcohols having $2n+2$ carbon atoms which comprises contacting an olefin having $n$ carbon atoms, where $n$ is a whole number from 2 to 12, in the presence of carbon monoxide and hydrogen under a pressure of at least 1000 p.s.i. and within a primary reaction range of from 100° C to 140° C. in combination with from 1 to 20% by weight relative to the charge of the said olefin, of a combination catalyst containing from 10% to 90% by weight of a compound selected from the group consisting of the oxides, hydroxides, salts and carbonyls of iron and cobalt in combination with from 90% to 10% by weight of an organic manganese salt, and thereafter subjecting the entire reaction mixture to a temperature of from 140° C. to 160° C. in order to condense the aldehydes having $n+1$ carbon atoms resulting from the first stage of oxonation to higher molecular weight aldehydes having $2n+2$ carbon atoms and thereafter, without the abstraction of any components, hydrogenating to obtain the alcohols.

4. A process for the production of alcohols having $2n+2$ carbon atoms which comprises contacting an olefin having $n$ carbon atoms, where $n$ is a whole number from 2 to 12, in the presence of carbon monoxide and hydrogen under a pressure of at least 1000 p.s.i. and within a primary reaction range of from 100° C. to 140° C. in combination with from 1 to 20% by weight relative to the charge of the said olefin, of a combination catalyst containing from 10% to 90% by weight of a compound selected from the group consisting of the oxides, hydroxides, salts and carbonyls of iron and cobalt in combination with from 90% to 10% by weight of an organic manganese salt, and thereafter subjecting the entire reaction mixture to a temperature of from 140° C. to 160° C. in order to condense the aldehydes having $n+1$ carbon atoms resulting from the first stage of oxonation to higher molecular weight aldehydes having $2n+2$ carbon atoms, and thereafter passing the entire reaction mixture to a zone having a temperature within the range of from 160° C. to 200° C. in order to hydrogenate, without the addition or abstraction of any components, the condensed aldehydes of the said intermediate zones to alcohols having $2n+2$ carbon atoms.

5. A process for the production of octyl alcohols which comprises contacting propylene in the presence of carbon monoxide and hydrogen under a pressure of at least 1000 p.s.i. and within the temperature range of from 100° C. to 140° C. in combination with from 1 to 20% by weight relative to the charge of the said olefin, of a combination catalyst containing from 10% to 90% by weight of a compound selected from the group consisting of the oxides, hydroxides, salts and carbonyls of iron and cobalt in combination with from 90% to 10% by weight of a manganese carboxylate, and thereafter subjecting the entire reaction mixture, without the addition or abstraction of any components to a temperature in the range of from 140° C. to 160° C. in order to condense the butyraldehydes resulting from the first stage of oxonation to octylaldehydes and thereafter, without the abstraction of any components, hydrogenating to obtain the alcohols.

6. A process for the production of octyl alcohols which comprises contacting propylene in the presence of carbon monoxide and hydrogen under a pressure of at least 1000 p.s.i. and within the temperature range of from 100° C. to 140° C. in combination with from 1 to 20% by weight relative to the charge of the said olefin, of a combination catalyst containing from 10% to 90% by weight of a compound selected from the group consisting of the oxides, hydroxides, salts and carbonyls of iron and cobalt in combination with from 90% to 10% by weight of a manganese salt selected from the group consisting of manganese stearate, α-ethylcaproate, dodecanoate, naphthenate and tallate, and thereafter subjecting the entire reaction mixture, without the addition or abstraction of any components, to a temperature in the range of from 140° C. to 160° C. in order to condense the butyraldehydes resulting from the first stage of oxonation to octylaldehydes, and thereafter passing the entire reaction mixture to a zone having a temperature within the range of from 160° C. to 200° C. in order to hydrogenate the said condensed aldehydes to octyl alcohols.

References Cited in the file of this patent

UNITED STATES PATENTS

| | | |
|---|---|---|
| 2,811,567 | Mason | Oct. 29, 1957 |
| 2,845,465 | Cull et al. | July 29, 1958 |
| 2,949,486 | Weesner et al. | Aug. 16, 1960 |